United States Patent
Yamamoto

(10) Patent No.: US 11,148,128 B2
(45) Date of Patent: Oct. 19, 2021

(54) HONEYCOMB STRUCTURE

(71) Applicant: NGK Insulators, Ltd., Nagoya (JP)

(72) Inventor: Hirotaka Yamamoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 285 days.

(21) Appl. No.: 16/281,431

(22) Filed: Feb. 21, 2019

(65) Prior Publication Data

US 2019/0262820 A1    Aug. 29, 2019

(30) Foreign Application Priority Data

Feb. 28, 2018 (JP) .............................. JP2018-035467

(51) Int. Cl.

| | |
|---|---|
| *B01J 35/04* | (2006.01) |
| *B01D 46/24* | (2006.01) |
| *B01J 35/10* | (2006.01) |
| *B01J 37/02* | (2006.01) |
| *B01J 37/08* | (2006.01) |

(Continued)

(52) U.S. Cl.
CPC ............ *B01J 35/04* (2013.01); *B01D 46/247* (2013.01); *B01D 46/2429* (2013.01); *B01D 46/2474* (2013.01); *B01D 53/9431* (2013.01); *B01J 29/00* (2013.01); *B01J 35/1076* (2013.01); *B01J 37/0201* (2013.01); *B01J 37/0236* (2013.01); *B01J 37/08* (2013.01); *F01N 3/281* (2013.01); *B01D 46/249* (2021.08);

(Continued)

(58) Field of Classification Search
None
See application file for complete search history.

(56) References Cited

U.S. PATENT DOCUMENTS

2003/0029142 A1* 2/2003 Noda ...................... B01J 35/04
                                                                55/282.3
2007/0119133 A1   5/2007 Beall et al.
(Continued)

FOREIGN PATENT DOCUMENTS

DE    20 2010 018 032 U1    9/2013
EP        2 038 236 A1    3/2009
(Continued)

OTHER PUBLICATIONS

Noguchi et al, JP 2002-219319, English Translation obtained from J-PlatPat (Year: 2002).*

(Continued)

*Primary Examiner* — Colin W. Slifka
(74) *Attorney, Agent, or Firm* — Burr & Brown, PLLC

(57) ABSTRACT

A honeycomb structure, including: a pillar-shaped honeycomb structure body having a first end face and a second end face and including a porous partition wall disposed so as to surround a plurality of cells, the plurality of cells extending from the first end face to the second end face and serving as a through channel of fluid, wherein
the partition wall has a porosity of 45 to 65%,
the partition wall has an average pore diameter of 15 to 25 µm, and
the partition wall has a cumulative pore volume, which is measured by mercury intrusion porosimetry, such that a pore volume ratio of pores having pore diameters of 10 µm or less relative to the overall pore volume of the partition wall is 10% or less, and a pore volume ratio of pores having pore diameters of 40 µm or more is 10% or less.

5 Claims, 4 Drawing Sheets

(51) Int. Cl.
*B01J 29/00* (2006.01)
*F01N 3/28* (2006.01)
*B01D 53/94* (2006.01)

(52) U.S. Cl.
CPC .. *B01D 46/24491* (2021.08); *B01D 46/24492* (2021.08); *B01D 2255/9155* (2013.01); *F01N 2330/02* (2013.01)

(56) References Cited

U.S. PATENT DOCUMENTS

| | | |
|---|---|---|
| 2008/0047243 A1 | 2/2008 | Beall et al. |
| 2011/0085940 A1 | 4/2011 | Ogyu et al. |
| 2012/0031061 A1 | 2/2012 | Beall et al. |
| 2013/0059724 A1 | 3/2013 | Hirose et al. |
| 2014/0070441 A1 | 3/2014 | Boger et al. |
| 2014/0290195 A1 | 10/2014 | Izumi et al. |
| 2014/0370233 A1 | 12/2014 | Izumi et al. |
| 2015/0166416 A1 | 6/2015 | Beall et al. |
| 2019/0076773 A1 | 3/2019 | Beall et al. |

FOREIGN PATENT DOCUMENTS

| | | | |
|---|---|---|---|
| JP | 2002219319 A | * 8/2002 | ......... B01D 46/2429 |
| JP | 2009517327 A | 4/2009 | |
| JP | 2009542429 A | 12/2009 | |
| JP | 2010501468 A | 1/2010 | |
| JP | 2011515309 A | 5/2011 | |
| JP | 2013-052367 A1 | 3/2013 | |
| JP | 2014-505646 A | 3/2014 | |
| JP | 2014-505647 A | 3/2014 | |
| JP | 2014189447 A | 10/2014 | |
| WO | 2013146954 A | 10/2013 | |
| WO | 2017161217 A1 | 9/2017 | |

OTHER PUBLICATIONS

Japanese Notification, Japanese Application No. 2018-035467, dated Apr. 13, 2021 (1 page).
Japanese Notification (with English translation), Japanese Application No. 2018-057065, dated Apr. 13, 2021 (2 pages).
German Office Action (with English translation), German Application No. 10 2019 202 557.9, dated Mar. 31, 2021 (6 pages).
Japanese Office Action, Japanese Application No. 2018-035467, dated Sep. 7, 2021 (6 pages).

* cited by examiner

HONEYCOMB STRUCTURE

The present application is an application based on JP-2018-035467 filed on Feb. 28, 2018 with Japan Patent Office, the entire contents of which are incorporated herein by reference.

BACKGROUND OF THE INVENTION

Field of the Invention

The present invention relates to honeycomb structures. More particularly, the present invention relates to a honeycomb structure capable of increasing the filling rate of catalyst, which is loaded to purify exhaust gas, into pores of the partition wall and suppressing an increase of pressure loss after loading with the catalyst to purify exhaust gas.

Description of the Related Art

Developed countries are examining to further tighten the standards on NOx emission from diesel-fueled vehicles and tracks. To meet such NOx emission standards, various techniques have been proposed to treat NOx in exhaust gas. One of these techniques manufactures a honeycomb structure having a porous partition wall loaded with Selective Catalytic Reduction catalyst (hereinafter this may be called "SCR catalyst"), for example, and treats NOx in exhaust gas with the honeycomb structure for purification (see Patent Literature 1).

Such a honeycomb structure can be loaded with an increased amount of catalyst to treat NOx, so as to improve the ability to purify exhaust gas. Meanwhile, when a honeycomb structure loaded with a catalyst is installed in the exhaust system of a diesel-fueled vehicle, for example, for NOx treatment, this may cause a problem of an increase of pressure loss. Especially a honeycomb structure loaded with an increased amount of catalyst to improve the purification performance may increase the pressure loss more significantly. That is, a honeycomb structure to treat NOx has a tradeoff relationship between "improving the purification performance" and "suppressing an increase of pressure loss". To overcome such a tradeoff relationship, a technique has been proposed to manufacture a honeycomb structure with increased porosity of the partition wall. Such a honeycomb structure with increased porosity of the partition wall is intended to suppress an increase of the pressure loss while increasing the amount of catalyst for loading, for example.

[Patent Document 1] JP-A-2013-052367

SUMMARY OF THE INVENTION

When the honeycomb structure with increased porosity of the partition wall is used as a catalyst carrier to be loaded with a catalyst to purify exhaust gas, a problem occurs when the catalyst enters the pore of the partition wall. For instance, a conventional honeycomb structure with a simply increased porosity of the partition wall has a problem that, when the catalyst particles are coarse or the catalyst slurry has high viscosity, the pores of the partition wall cannot be filled with the catalyst evenly, and so some of the pores are not filled with the catalysts. Note here that the catalyst slurry refers to a muddy matter including catalyst particles mixed in liquid to have turbidity.

When the pores of the partition wall of the above-mentioned conventional honeycomb structure are filled with catalysts, the catalysts firstly enter the pores having a larger pore diameter (hereinafter they may be called "larger pores"), and such catalysts in larger pores then move to pores having a smaller pore diameter (hereinafter they may be called "smaller pores"). This means that smaller pores are preferentially filled with the catalysts, and there are some of the larger pores that are not completely filled with the catalysts in the final honeycomb structure. Such a honeycomb structure having the pores filled with the catalysts unevenly will have larger pressure loss.

In view of such problems of the conventional techniques, the present invention provides a honeycomb structure capable of increasing the filling rate of catalysts, which are loaded to purify exhaust gas, into pores of the partition wall and suppressing an increase of pressure loss after loading with the catalysts to purify exhaust gas.

The present invention provides the following honeycomb structure.

According to a first aspect of the present invention, a honeycomb structure is provided, including: a pillar-shaped honeycomb structure body having a first end face and a second end face and including a porous partition wall disposed so as to surround a plurality of cells, the plurality of cells extending from the first end face to the second end face and serving as a through channel of fluid; wherein the partition wall has a porosity of 45 to 65%, the partition wall has an average pore diameter of 15 to 25 µm, and the partition wall has a cumulative pore volume, which is measured by a mercury intrusion porosimetry, such that a pore volume ratio of pores having pore diameters of 10 µm or less relative to the overall pore volume of the partition wall is 10% or less, and a pore volume ratio of pores having pore diameters of 40 µm or more is 10% or less.

According to a second aspect of the present invention, the honeycomb structure according to the first aspect is provided, wherein the partition wall has a thickness of 0.089 to 0.203 mm.

According to a third aspect of the present invention, the honeycomb structure according to the first or second aspects is provided, wherein the honeycomb structure body has a cell density of 31 to 140 cells/cm$^2$.

According to a fourth aspect of the present invention, the honeycomb structure according to any one or the first to third aspects is provided, wherein the partition wall includes at least one type of materials selected from the group consisting of silicon carbide, cordierite, silicon-silicon carbide composite material, cordierite-silicon carbide composite material, silicon nitride, mullite, alumina, and aluminum titanate.

According to a fifth aspect of the present invention, the honeycomb structure according to any one of the first to fourth aspects is provided, further including catalysts to purify exhaust gas that are loaded inside of pores of the partition wall.

The honeycomb structure of the present invention can increase the filling rate of catalysts, which are loaded to purify exhaust gas, into pores of the partition wall and can suppress an increase of a pressure loss after loading with the catalysts to purify exhaust gas. Specifically the honeycomb structure of the present invention reduces the number of pores having pore diameters that are less fillable with catalysts, and so the pores of the partition wall can be easily filled with the catalysts. This can effectively suppress an increase of a pressure loss of the honeycomb structure after loading with the catalysts to purify exhaust gas. In this way, the honeycomb structure can suppress an increase of a pressure loss while increasing the amount of catalysts for loading, for example, and can achieve compatibility between the "improving the purification performance" and "suppressing an increase of a pressure loss".

DESCRIPTION OF THE PREFERRED EMBODIMENTS

The following describes embodiments of the present invention, and the present invention is not limited to the following embodiments. The present invention is to be understood to include the following embodiments, to which modifications and improvements are added as needed based on the ordinary knowledge of a person skilled in the art without departing from the scope of the present invention.

(1) Honeycomb Structure (First Embodiment)

Figure 1:
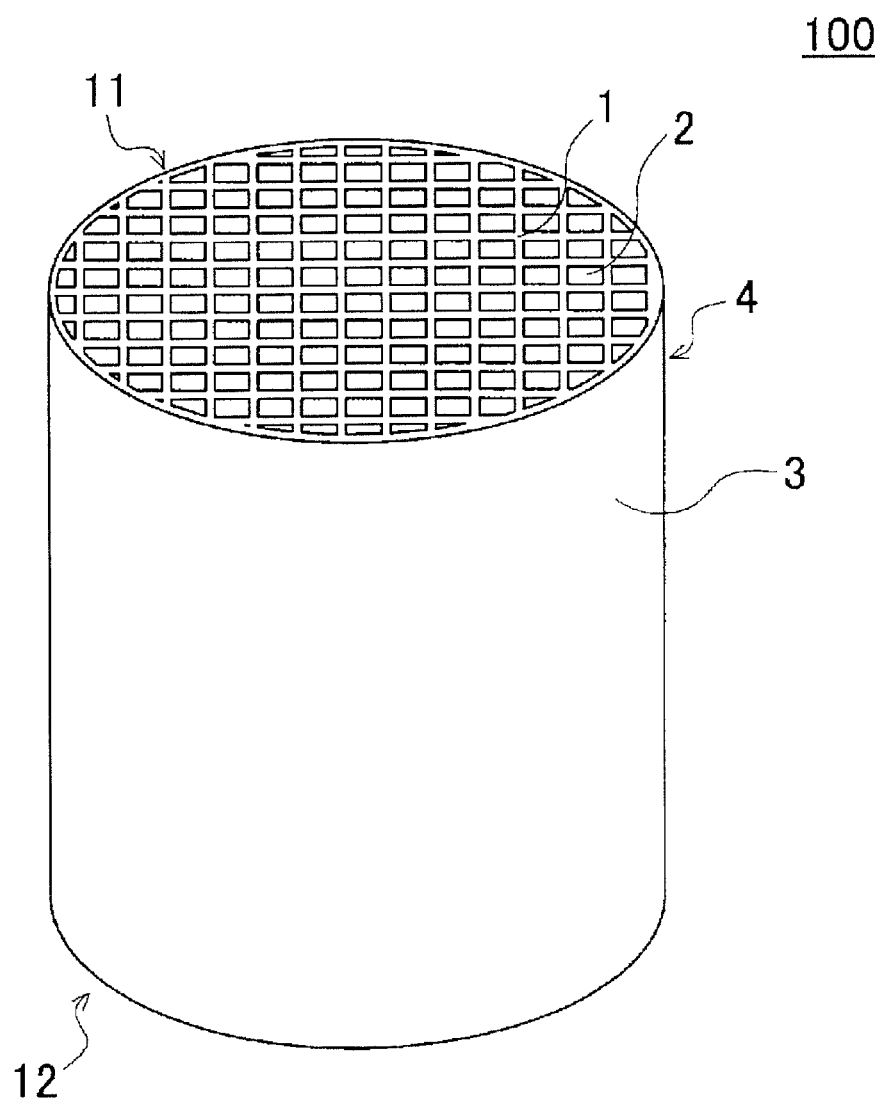
FIG. 1 is a perspective view schematically showing a first embodiment of the honeycomb structure of the present invention.
Figure 2:
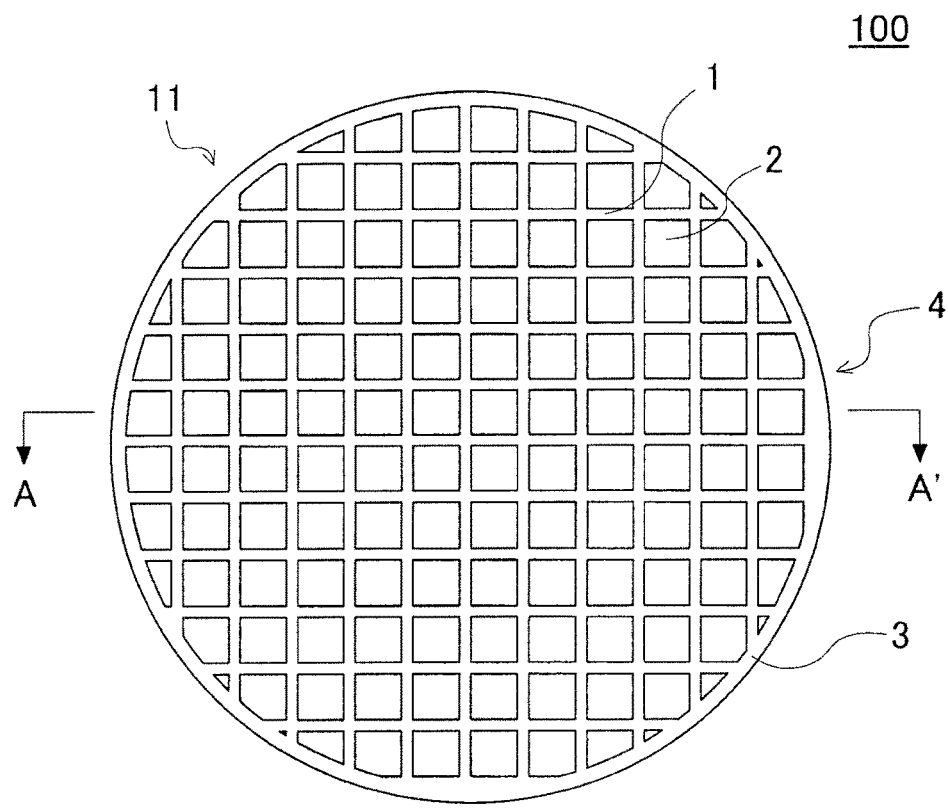
FIG. 2 is a plan view showing the side of the first end face of the honeycomb structure of FIG. 1.
Figure 3:
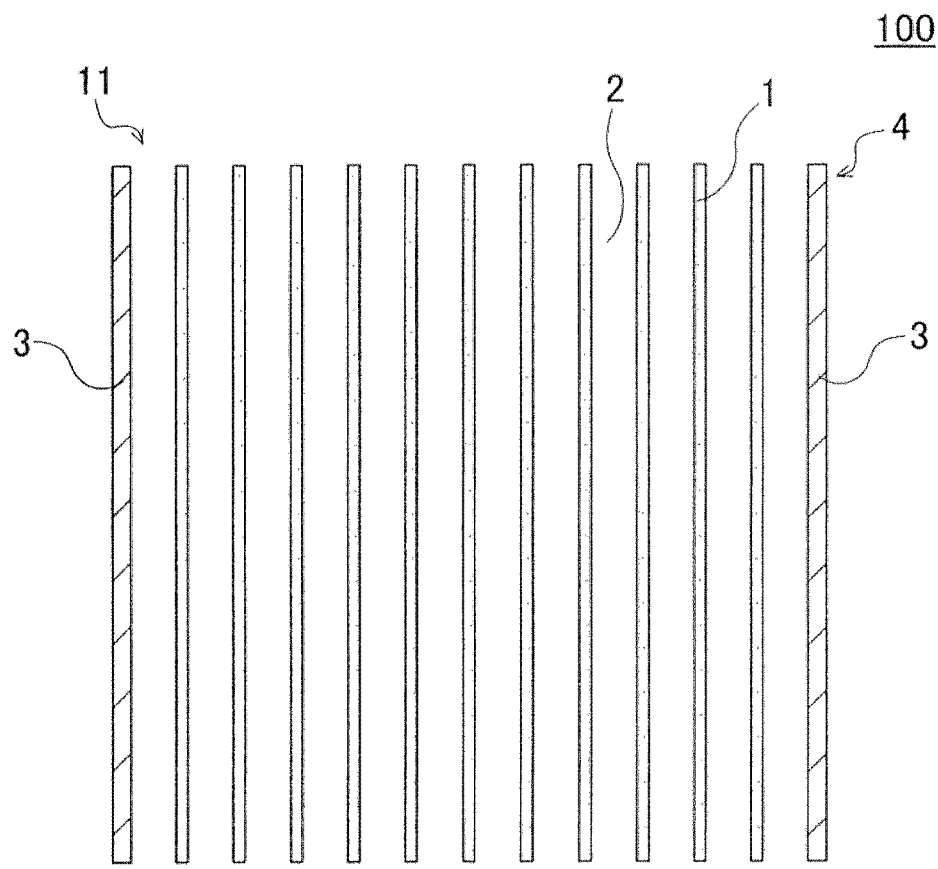
FIG. 3 is a schematic cross-sectional view taken along the line A-A' of FIG. 2.

A first embodiment of the honeycomb structure of the present invention is a honeycomb structure 100 as shown in FIGS. 1 to 3. FIG. 1 is a perspective view schematically showing the first embodiment of the honeycomb structure of the present invention. FIG. 2 is a plan view showing the side of a first end face of the honeycomb structure of FIG. 1. FIG. 3 is a schematic cross-sectional view taken along the line A-A' of FIG. 2.

As shown in FIGS. 1 to 3, the honeycomb structure 100 of the present embodiment includes a pillar-shaped honeycomb structure body 4 having a first end face 11 and a second end face. The honeycomb structure body 4 has a porous partition wall 1 that surrounds a plurality of cells 2, and the plurality of cells extends from the first end face 11 to the second end face 12 of the honeycomb structure body and serves as a through channel of fluid. In the honeycomb structure 100 of the present embodiment, the honeycomb structure body 4 has a round pillar shape, and further includes a circumferential wall 3 at the outer circumferential side face. That is, the circumferential wall 3 surrounds the grid-patterned partition wall 1.

The honeycomb structure 100 of the present embodiment has a porosity of the partition wall 1 that is 45 to 65%. The partition wall 1 has an average pore diameter of 15 to 25 μm. The partition wall 1 has a cumulative pore volume, which is measured by a mercury intrusion porosimetry, such that a pore volume ratio of pores having pore diameters of 10 μm or less relative to the overall pore volume of the partition wall 1 is 10% or less, and a pore volume ratio of pores having pore diameters of 40 μm or more is 10% or less.

The honeycomb structure 100 of the present embodiment can increase the filling rate of catalysts that are loaded to purify exhaust gas into pores of the partition wall 1 and can suppress an increase of a pressure loss after loading with the catalysts to purify exhaust gas. More specifically the honeycomb structure 100 of the present invention reduces the number of pores having pore diameters that are less fillable with catalysts, and so the pores of the partition wall 1 can be easily filled with the catalysts. This can effectively suppress an increase of a pressure loss of the honeycomb structure 100 after loading with the catalyst to purify exhaust gas. In this way, the honeycomb structure 100 can suppress an increase of a pressure loss while increasing the amount of catalyst for loading, for example, and can achieve compatibility between the "improving the purification performance" and "suppressing an increase of a pressure loss" as well.

The partition wall 1 of the honeycomb structure 100 of the present embodiment has a porosity of 45 to 65%. If the partition wall 1 configured to meet the conditions of the pore volume ratio as stated above has the porosity less than 45%, the honeycomb structure loaded with the catalyst to purify exhaust gas has a significantly large pressure loss. On the contrary, if the porosity of the partition wall 1 exceeds 65%, the isostatic strength of the honeycomb structure 100 will deteriorate. The porosity of the partition wall 1 is a value measured by a mercury intrusion porosimetry. The porosity of the partition wall 1 can be measured using Autopore 9500 (product name) produced by Micromeritics Co, for example. To measure the porosity, a part of the partition wall 1 may be cut out from the honeycomb structure 100 to prepare a test piece for the measurement. The porosity of the partition wall 1 is not limited especially, and is preferably 45 to 55%, and more preferably 48 to 52%.

The average pore diameter of the partition wall 1 of the honeycomb structure 100 of the present embodiment is 15 to 25 μm. If the partition wall 1 configured to meet the conditions of the pore volume ratio as stated above has the average pore diameter less than 15 μm, the pores of the partition wall 1 are less fillable with catalysts, and so the ability of the catalyst carrier to be load with the catalysts will deteriorate. If the partition wall 1 has the average pore diameter exceeding 25 μm as well, the pores of the partition wall 1 are less fillable with catalysts, and so the ability of the catalyst carrier to be load with the catalysts will deteriorate. The average pore diameter of the partition wall 1 is a value measured by a mercury intrusion porosimetry. Similarly to the measurement of the porosity, the average pore diameter of the partition wall 1 can be measured using Autopore 9500 (product name) produced by Micromeritics Co, for example. The average pore diameter of the partition wall 1 preferably is 20 to 25 μm, and more preferably 22 to 25 μm.

The partition wall 1 of the honeycomb structure 100 of the present embodiment has a cumulative pore volume, which is measured by a mercury intrusion porosimetry, such that a pore volume ratio of pores having pore diameters of m or less is 10% or less, and a pore volume ratio of pores having pore diameters of m or more is 10% or less. The cumulative pore volume of the partition wall 1 can be measured using Autopore 9500 (product name) produced by Micromeritics Co, for example. Specifically the cumulative pore volume of the partition wall 1 can be measured by the following method. Firstly a part of the partition wall 1 is cut out from the honeycomb structure 100 to prepare a test piece for the measurement of the cumulative pore volume. The size of the test piece is not limited especially, which is a cuboid of about 10 mm, about 10 mm and about 10 mm in width, height and depth, respectively, for example, preferably. A part of the partition wall 1 to be cut out as the test piece is not limited especially. Preferably the test piece is cut out from a part close to the center in the axial direction of the honeycomb structure body 4. The prepared test piece is placed in a measurement cell of a measurement apparatus, and the pressure in this measurement cell is reduced. Next, mercury is introduced into the measurement cell. Next, mercury introduced in the measurement cell is pressurized, and the volume of mercury that enters the pores of the test piece during the pressurization is measured. At this time, as the pressure applied to mercury increases, mercury enters pores having a larger pore diameter first and then enters pores having a smaller pore diameter. Thus the relationship between the "pore diameter of the pores formed in the test piece" and the "cumulative pore volume" can be obtained based on the relationship between the "pressure applied to the mercury" and the "volume of the mercury entering the pores". The "cumulative pore volume" is a value obtained by accumulating the pore volume values from a smallest pore diameter to a certain pore diameter. For instance, a "pore volume ratio of pores having pore diameters of 10 μm or less" is percentage ($pv_1/PV_{all} \times 100\%$) of the ratio of the pore volume $pv_1$ of pores having pore diameters of 10 μm or less relative to the overall pore volume $PV_{all}$ represented by the cumulative pore volume. Similarly a "pore volume ratio of pores having pore diameters of 40 μm or more" is percentage ($pv_2/PV_{all} \times 100\%$) of the ratio of the pore volume $pv_2$ of pores having pore diameters of 40 μm or more relative to the overall pore volume $PV_{all}$ represented by the cumulative pore volume.

In the honeycomb structure 100 of the present embodiment, if the partition wall 1 configured to meet the above-stated porosity and average pore diameter has the pore volume ratio of the pores having pore diameters of 10 μm or less exceeding 10%, then the pores of the partition wall 1 become less fillable with catalysts. Similarly if the pore volume ratio of the pores having pore diameters of 40 μm or more exceeds 10%, then the pores of the partition wall 1 become less fillable with catalysts. If the pores of the partition wall 1 become less fillable with catalysts, an increase of the pressure loss of the honeycomb structure loaded with the catalyst will be significantly large.

In the honeycomb structure 100 of the present embodiment, the pore volume ratio of the pores having the pore diameter of 10 μm or less is not limited especially, and is preferably 0 to 10%, and more preferably 0 to 5%. The pore volume ratio of the pores having the pore diameter of 40 μm or more is preferably 0 to 10%, and more preferably 0 to 5%.

In the honeycomb structure 100 shown in FIGS. 1 to 3, the partition wall 1 preferably has a thickness of 0.089 to 0.203 mm, more preferably 0.089 to 0.165 mm, and particularly preferably 0.089 to 0.140 mm. The thickness of the partition wall 1 can be measured with a scanning electron microscope or a microscope, for example. If the thickness of the partition wall 1 is less than 0.089 mm, the strength may not be enough. If the thickness of the partition wall 1 exceeds 0.203 mm, when such a partition wall 1 is loaded with catalyst, an increasing rate of the pressure loss after loading with the catalyst may increase. For instance, when a catalyst is loaded at the partition wall 1, the catalyst is introduced into the interior of the pore of the partition wall 1 by sucking slurry including the catalyst. If the partition wall 1 is too thick, it is difficult to achieve a sufficient suction force. In that case, the catalyst will be concentrated to a part close to the surface of the partition wall 1, and so an increasing ratio of the pressure loss may be large.

The shape of the cells 2 in the honeycomb structure body 4 is not limited especially. For instance, the cells 2 may have a polygonal shape, a circular shape, an elliptic shape, and the like in a cross section orthogonal to the extending direction of the cells 2. Examples of the polygonal shape include a triangle, a quadrangle, a pentagon, a hexagon, and an octagon. Preferably the shape of the cells 2 is a triangle, a quadrangle, a pentagon, a hexagon, and an octagon. For the shape of the cells 2, all of the cells 2 may have the same shape, or the cells 2 may have different shapes. For instance, although not shown, quadrangular cells and octagonal cells may be combined. For the size of the cells 2, all of the cells 2 may have the same size, or the cells 2 may have different sizes. For instance, although not shown, some of the plurality of cells may be larger, and other cells may be smaller relatively. In the present invention, cells refer to a space surrounded with the partition wall.

Preferably the cells 2 defined by the partition wall 1 have a cell density that is 31 to 140 cells/cm$^2$, more preferably 47 to 116 cells/cm$^2$, and particularly preferably 47 to 93 cells/cm$^2$. The thus configured honeycomb structure 100 of the present embodiment can be favorably used as a member for purification (e.g., catalyst carrier or filter) to purify exhaust gas emitted from an automobile engine.

The circumferential wall 3 of the honeycomb structure body 4 may be monolithic with the partition wall 1 or may be a circumference coating layer that is formed by applying a circumference coating material so as to surround the partition wall 1. Although not illustrated, during the manufacturing process, the partition wall and the circumferential wall may be formed in a monolithic manner, and then the circumferential wall formed may be removed by a known method, such as grinding. Then, the circumference coating layer may be disposed at the side of the circumference of the partition wall.

The shape of the honeycomb structure body 4 is not limited especially. Examples of the shape of the honeycomb structure body 4 include a pillar shape in which the first end face 11 and the second end face 12 have a shape, such as a circle, an ellipse, or a polygon.

The size of the honeycomb structure body 4, including the length from the first end face 11 to the second end face 12 and the size of a cross section orthogonal to the extending direction of the cells 2 of the honeycomb structure body 4, is not limited especially. The size may be selected appropriately so that the honeycomb structure 100 of the present embodiment can have the optimum ability for purification when it is used as a member to purify exhaust gas. For instance, the length from the first end face 11 to the second end face 12 of the honeycomb structure body 4 is preferably 51 to 254 mm, more preferably 76 to 229 mm, and particularly preferably 102 to 203 mm. The area of a cross section orthogonal to the extending direction of the cells 2 of the honeycomb structure body 4 is preferably 2020 to 99320 mm$^2$, more preferably 4560 to 85640 mm$^2$ and particularly preferably 8100 to 72680 mm$^2$.

Preferably the partition wall 1 is made of at least one type of materials selected from the group consisting of silicon carbide, cordierite, silicon-silicon carbide composite material, cordierite-silicon carbide composite material, silicon nitride, mullite, alumina, and aluminum titanate. The material of the partition wall 1 preferably includes the materials as stated above accounting for 30 mass % or more, more preferably 40 mass % or more, and particularly preferably 50 mass % or more. The silicon-silicon carbide composite material is a composite material including silicon carbide as the aggregate and silicon as the binder. The cordierite-silicon carbide composite material is a composite material including silicon carbide as the aggregate and cordierite as the binder.

In the honeycomb structure 100 of the present embodiment, a particularly preferable material of the partition wall 1 is cordierite.

In the honeycomb structure 100 of the present embodiment, the partition wall 1 defining the plurality of cells 2 may be loaded with a catalyst to purify exhaust gas. Loading the partition wall 1 with the catalyst refers to loading of the catalyst at the surface of the partition wall 1 or in the pores formed in the partition wall 1. More particularly, the honeycomb structure 100 of the present embodiment can increase the amount of catalysts to purify exhaust gas that are loaded in the pores of the partition wall 1, and so can suppress an increase of pressure loss after loading with the catalyst to purify exhaust gas.

The loading amount of the catalyst loaded at the partition wall 1 of the honeycomb structure body 4 per unit volume may be determined appropriately depending on the type of the catalyst used. For instance, the honeycomb structure 100 of the present embodiment may have the filling rate of catalyst relative to the overall volume of the pores of the partition wall 1 that is 80% or more. As a method for loading the catalyst, a catalyst slurry containing a catalyst component may be wash-coated on the honeycomb structure body 4, followed by a heat treatment at high temperatures for burning, for example.

(2) Honeycomb Structure (Second Embodiment)

Figure 4:
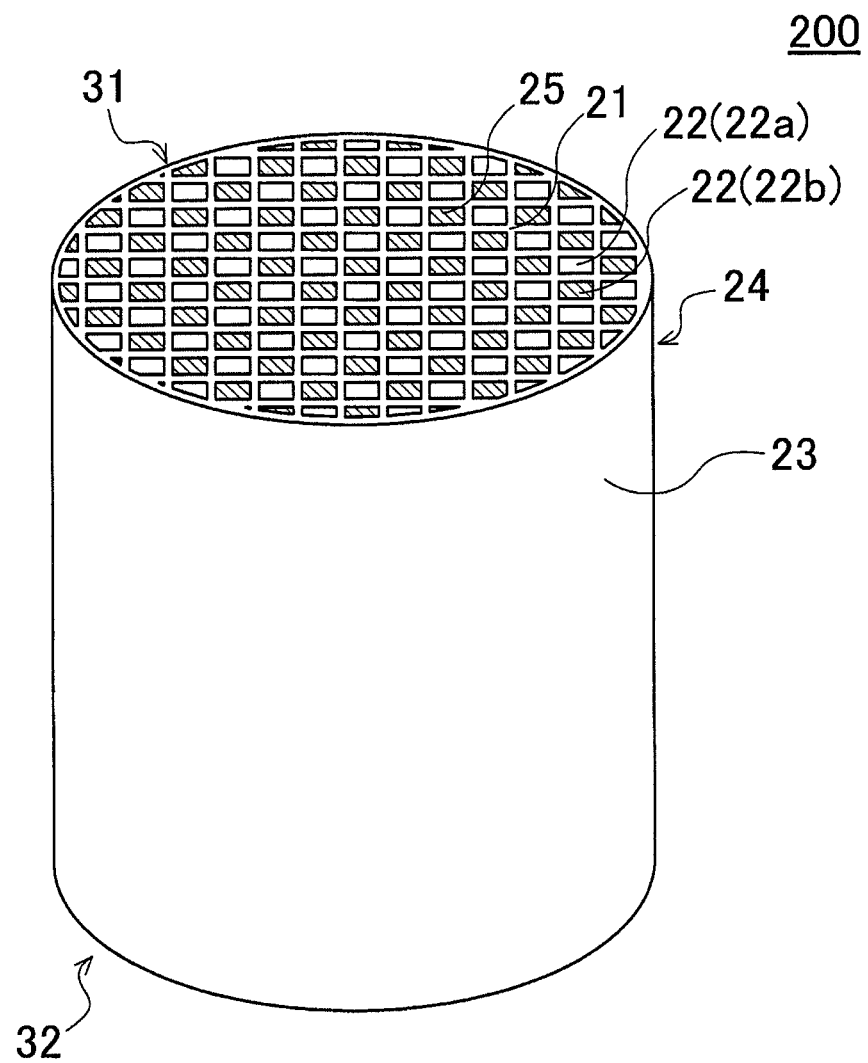
FIG. 4 is a perspective view schematically showing a second embodiment of the honeycomb structure of the present invention.
Figure 5:
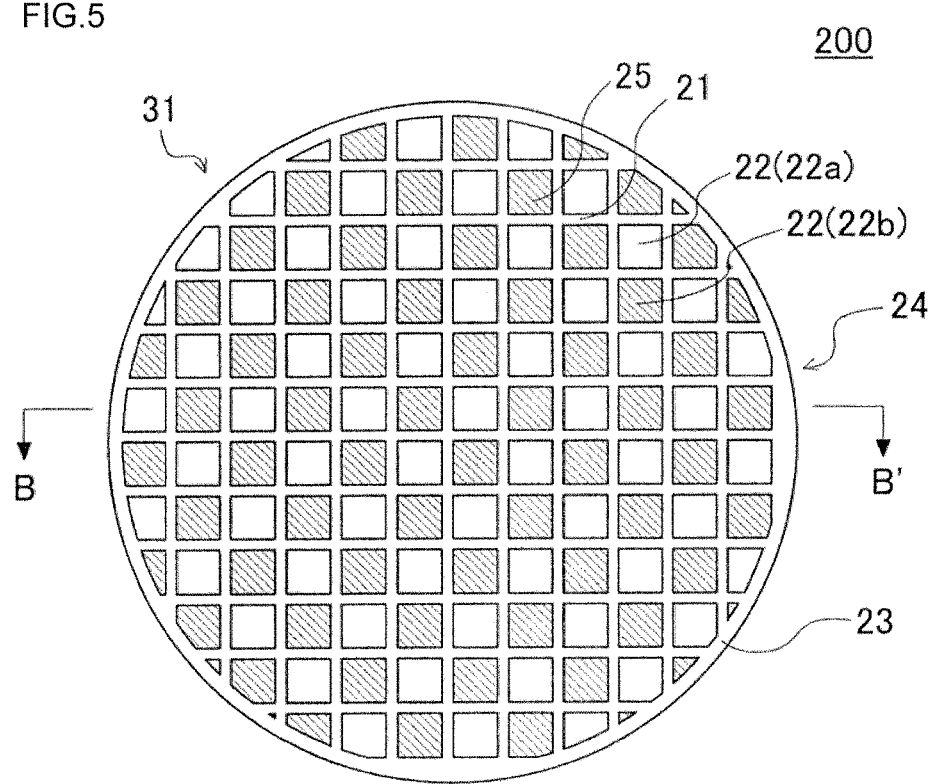
FIG. 5 is a plan view showing the side of the first end face of the honeycomb structure of FIG. 4.
Figure 6:
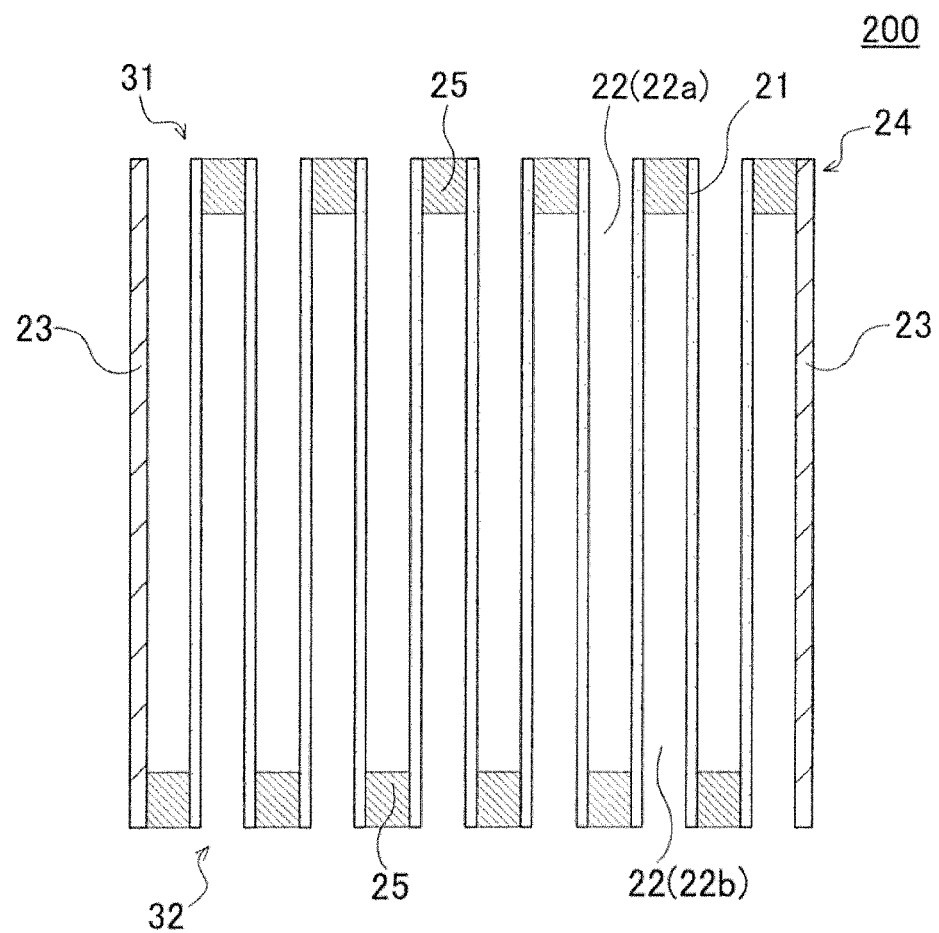
FIG. 6 is a schematic cross-sectional view taken along the line B-B' of FIG. 5.

The following describes a second embodiment of the honeycomb structure of the present invention. The second embodiment of the honeycomb structure of the present invention is a honeycomb structure 200 as shown in FIGS. 4 to 6. FIG. 4 is a perspective view schematically showing the second embodiment of the honeycomb structure of the present invention. FIG. 5 is a plan view showing the side of the first end face of the honeycomb structure of FIG. 4. FIG. 6 is a schematic cross-sectional view taken along the line B-B' of FIG. 5.

As shown in FIGS. 4 to 6, the honeycomb structure 200 of the present embodiment is a honeycomb structure 200 including a honeycomb structure body 24 and a plugging portion 25. The honeycomb structure body 24 is a pillar-shaped body including a porous partition wall 21 that surrounds a plurality of cells 22, and the plurality of cells extends from a first end face 31 to a second end face 32 of the honeycomb structure body and serves as a through channel of fluid. In the honeycomb structure 200, the honeycomb structure body 24 has a round pillar shape, and further includes a circumferential wall 23 at the outer circumferential side face. That is, the circumferential wall 23 surrounds the grid-patterned partition wall 21. The plugging portion 25 is disposed in an open end at the first end face 31 of each of the cells 22 or in an open end at the second end face 32 of each of the cells 22.

The honeycomb structure 200 has a porosity of the partition wall 21 that is 45 to 65%. The partition wall 21 has an average pore diameter of 15 to 25 μm. The partition wall 21 has a cumulative pore volume, which is measured by a mercury intrusion porosimetry, such that a pore volume ratio of pores having pore diameters of 10 μm or less is 10% or less, and a pore volume ratio of pores having pore diameters of 40 μm or more is 10% or less. Similarly to the honeycomb structure 100 (see FIG. 1) of the first embodiment as stated above, the honeycomb structure 200 also can increase the filling rate of catalysts that are loaded to purify exhaust gas into pores of the partition wall 21 after loading with the catalysts to purify exhaust gas. The honeycomb structure 200 of the present embodiment therefore can suppress an increase of pressure loss of the honeycomb structure after loading with the catalyst to purify exhaust gas.

Preferably the honeycomb structure body 24 of the honeycomb structure 200 is configured similarly to the honeycomb structure body 4 of the honeycomb structure 100 (see FIG. 1) of the first embodiment as stated above.

The honeycomb structure 200 of the present embodiment includes a plugging portion 25 disposed in an open end at the first end face 31 of each of predetermined cells 22 and in an open end at the second end face 32 of each of the residual cells 22. The honeycomb structure 200 of the present embodiment can be used as a filter to purify exhaust gas, for example. The honeycomb structure 200, for instance, can be used as a honeycomb filter where the first end face 31 is an inflow end face through which exhaust gas flows in and the second end face 32 is an outflow end face through which exhaust gas purified in the honeycomb structure 200 flows out.

For instance, the cells 22 having a plugging portion 25 disposed in the open ends of the side of the second end face 32 and that are open at the side of the first end face 31 are inflow cells 22a. The cells 22 having a plugging portion 25 disposed in the open ends of the side of the first end face 31 and that are open at the side of the second end face 32 are outflow cells 22b. Preferably the inflow cells 22a and the outflow cells 22b are arranged alternately via the partition wall 21. Thereby, a checkerboard pattern is preferably formed with the "plugging portion 25" and the "open ends of the cells 22" at each of the end faces of the honeycomb structure 200.

Preferably the plugging portion 25 is made of a material selected from favorable materials for the partition wall 1 (see FIG. 1) of the honeycomb structure 100 (see FIG. 1) of the first embodiment. The plugging portion 25 and the partition wall 21 may be made of the same material or of different materials.

(3) Method for Manufacturing a Honeycomb Structure

A method for manufacturing the honeycomb structure of the present invention is not limited especially, and the honeycomb structure can be manufactured by the following method, for example. Firstly a kneaded material having plasticity is prepared to produce a honeycomb structure body. The kneaded material to produce a honeycomb structure body can be prepared by adding additives, such as a binder, a pore former and water as needed to a material selected as raw material powder from the aforementioned materials suitable for the partition wall of the honeycomb structure body. As the raw material powder, silicon carbide powder and metal silicon powder may be mixed for use, for example. Examples of the binder include methylcellulose and hydroxypropyl methylcellulose. Examples of the additives include surfactant. The porosity and the distribution of a pore diameter of the partition wall can be controlled by adjusting the particle diameter and additive amount of the pore former. More particularly the following method is available, for example, to form pores having pore diameters of 10 μm or less that has a pore volume ratio of 10% or less and pores having pore diameters of 40 μm or more that has a pore volume ratio of 10% or less. In the curve indicating the relationship between the particle diameter of the pore former and the cumulative volume (value obtained by accumulating the volume values of particles having a certain particle diameter or less), particle diameter d90 corresponding to the cumulative volume of 90% is 1.5 to 2.5 times the median size and particle diameter d10 corresponding to the cumulative volume of 10% is 0.2 to 0.8 time the median size.

The thus prepared kneaded material is extruded, thereby producing a pillar-shaped honeycomb formed body having a partition wall defining a plurality of cells and a circumferential wall surrounding this partition wall.

The thus obtained honeycomb formed body is then dried by microwaves and hot air, for example. To manufacture a honeycomb structure having a plugging portion, open ends of the cells of the honeycomb formed body before drying or after drying may be plugged so as to produce the plugging portion. The plugging portion may be made of a material similar to that of the honeycomb formed body, for example. After forming the plugging portion, the honeycomb formed body may be dried again.

Next the honeycomb formed body is fired to manufacture a honeycomb structure. Temperatures and atmosphere for the firing differ according to the raw material, and those skilled in the art can select the temperature and atmosphere for the firing that are the most suitable for the selected material.

EXAMPLES

The following describes the present invention more specifically by way of examples, and the present invention is by no means limited to these examples.

Example 1

2.5 parts by mass of a pore former, 60 parts by mass of a dispersing medium, and 6 parts by mass of an organic binder were added to 100 parts by mass of the cordierite forming raw material, followed by mixing and kneading to prepare a kneaded material. As the cordierite forming raw material, alumina, aluminum hydroxide, kaolin, talc, and silica were used. As the dispersing medium, water was used. As the organic binder, methylcellulose was used. As the dispersing agent, dextrin was used.

As the pore former, an water absorptive polymer having the average particle diameter of 20 μm was used. The pore former that has been used showed the following values in the curve indicating the relationship between the particle diameter of the pore former and the cumulative volume (a value obtained by accumulating the volume values of particles having a certain particle diameter or less). More specifically the pore former that has been used showed, in the curve, the particle diameter d90 corresponding to 90% of the cumulative volume that was 2.0 times the median size and the particle diameter d10 corresponding to 10% of the cumulative volume that was 0.5 time the median size.

Next, the kneaded material was extruded using a die for manufacturing of a honeycomb formed body to have a honeycomb formed body having a round pillar shape as the overall shape. The cells of the honeycomb formed body had a quadrangular shape.

Next, this honeycomb formed body was dried by a microwave dryer, and then was dried completely by a hot-air drier, and then both end faces of the honeycomb formed body were cut so as to have predetermined dimensions. Next the dried honeycomb formed body was degreased and fired, so as to obtain a honeycomb structure of Example 1.

The honeycomb structure of Example 1 had a round pillar shape, where the first end face and the second end face were round. The first end face and the second end face had the diameter of 267 mm. The honeycomb structure had the length in the cell extending direction of 152 mm. The honeycomb structure of Example 1 had the thickness of the partition wall of 0.132 mm and the cell density of 47 cells/cm². Table 1 shows the thickness of the partition wall and the cell density of the honeycomb structure.

TABLE 1

| | Cell structure | | | Overall pore volume (cc/g) | Average pore diameter (μm) | Ratio of pore volume in the section of 10 to 40 μm (%) | Ratio of pore volume in the section of 10 μm or less (%) | Ratio of pore volume in the section of 40 μm or more (%) |
| --- | --- | --- | --- | --- | --- | --- | --- | --- |
| | Thickness of partition wall (mm) | Cell density (cells/cm²) | Porosity (%) | | | | | |
| Example. 1 | 0.132 | 47 | 50 | 0.40 | 20 | 85 | 7 | 8 |
| Example. 2 | 0.114 | 62 | 45 | 0.32 | 15 | 87 | 10 | 3 |
| Example. 3 | 0.114 | 93 | 65 | 0.74 | 21 | 84 | 9 | 7 |
| Example. 4 | 0.165 | 47 | 53 | 0.45 | 25 | 82 | 8 | 10 |
| Example. 5 | 0.140 | 62 | 58 | 0.55 | 20 | 90 | 7 | 3 |
| Example. 6 | 0.089 | 93 | 55 | 0.49 | 17 | 80 | 10 | 10 |
| Example. 7 | 0.203 | 31 | 52 | 0.43 | 21 | 85 | 7 | 8 |
| Example. 8 | 0.165 | 47 | 48 | 0.37 | 16 | 86 | 9 | 5 |
| Example. 9 | 0.114 | 93 | 57 | 0.53 | 23 | 83 | 7 | 10 |
| Example. 10 | 0.089 | 116 | 50 | 0.40 | 24 | 81 | 9 | 10 |
| Example. 11 | 0.089 | 140 | 54 | 0.47 | 18 | 84 | 10 | 6 |
| Example. 12 | 0.132 | 47 | 46 | 0.34 | 22 | 88 | 4 | 8 |
| Comparative Example. 1 | 0.132 | 47 | 44 | 0.31 | 16 | 82 | 9 | 8 |
| Comparative Example. 2 | 0.089 | 93 | 66 | 0.77 | 23 | 84 | 6 | 10 |
| Comparative Example. 3 | 0.114 | 93 | 54 | 0.47 | 14 | 82 | 11 | 7 |
| Comparative Example. 4 | 0.140 | 62 | 48 | 0.37 | 23 | 79 | 10 | 11 |
| Comparative Example. 5 | 0.114 | 62 | 55 | 0.49 | 26 | 78 | 8 | 14 |
| Comparative Example. 6 | 0.165 | 47 | 60 | 0.60 | 17 | 73 | 15 | 13 |

TABLE 1-continued

| | Cell structure | | | Overall pore volume (cc/g) | Average pore diameter (μm) | Ratio of pore volume in the section of 10 to 40 μm (%) | Ratio of pore volume in the section of 10 μm or less (%) | Ratio of pore volume in the section of 40 μm or more (%) |
|---|---|---|---|---|---|---|---|---|
| | Thickness of partition wall (mm) | Cell density (cells/cm²) | Porosity (%) | | | | | |
| Comparative Example. 7 | 0.132 | 47 | 65 | 0.74 | 17 | 84 | 5 | 11 |
| Comparative Example. 8 | 0.140 | 62 | 65 | 0.74 | 16 | 79 | 10 | 11 |
| Comparative Example. 9 | 0.165 | 47 | 63 | 0.68 | 17 | 74 | 5 | 21 |
| Comparative Example. 10 | 0.114 | 62 | 61 | 0.62 | 19 | 78 | 10 | 12 |
| Comparative Example. 11 | 0.203 | 31 | 65 | 0.74 | 15 | 74 | 16 | 10 |
| Comparative Example. 12 | 0.203 | 31 | 60 | 0.60 | 21 | 80 | 7 | 13 |
| Comparative Example. 13 | 0.114 | 93 | 60 | 0.59 | 24 | 83 | 3 | 14 |

For the honeycomb structure of Example 1, the "porosity (%)", the "overall pore volume (cc/g)" and the "average pore diameter (μm)" were measured by the following method. Table 1 shows the result.

For the measurement of the overall pore volume, a "pore volume (cc/g) of pores having pore diameters of 10 μm or less", a "pore volume (cc/g) of pores having pore diameters of 10 to 40 μm", and a "pore volume (cc/g) of pores having pore diameters of 40 μm or more" were measured. In Table 1, the column of "ratio (%) of pore volume in the section of 10 μm or less" indicates the percentage of the ratio of the "pore volume (cc/g) of pores having pore diameters of 10 μm or less" relative to the "overall pore volume (cc/g). The column of "ratio (%) of pore volume in the section of 10 to 40 μm" indicates the percentage of the ratio of the "pore volume (cc/g) of pores having pore diameters of 10 to 40 μm" relative to the "overall pore volume (cc/g). The column of "ratio (%) of pore volume in the section of 40 μm or more" indicates the percentage of the ratio of the "pore volume (cc/g) of pores having pore diameters of 40 μm or more" relative to the "overall pore volume (cc/g).

(Porosity (%))

A porosity was measured using Autopore 9500 (product name) produced by Micromeritics Co. To measure the porosity, a part of the partition wall was cut out from the honeycomb structure to prepare a test piece, and the porosity of the obtained test piece was measured. The test piece was a cuboid of about 10 mm, about 10 mm and about 10 mm in width, height and depth, respectively. The test piece was cut out from a part close to the center in the axial direction of the honeycomb structure.

(Overall Pore Volume (cc/g))

An overall pore volume of the partition wall was measured using Autopore 9500 (product name) produced by Micromeritics Co. The overall pore volume also was measured using the same test piece as in the measurement of the porosity. For the measurement of the overall pore volume, the cumulative pore volume of the partition wall was measured, and the "pore volume of pores having pore diameter of 10 μm or less", the "pore volume of pores having pore diameters of 10 to 40 μm", and the "pore volume of pores having pore diameters of 40 μm or more" as stated above also were measured at the same time.

(Average Pore Diameter (μm))

An average pore diameter of the partition wall was measured using Autopore 9500 (product name) produced by Micromeritics Co. The average pore diameter also was measured using the same test piece as in the measurement of the porosity.

For the honeycomb structure of Example 1, the porosity of the partition wall was 50%, the overall pore volume was 0.40 cc/g and the average pore diameter was 20 μm.

A catalyst was loaded onto the partition wall of the honeycomb structure of Example 1 by the following method. Firstly a catalyst slurry containing zeolite having the average particle diameter of 5 μm was prepared. This catalyst slurry was loaded at the honeycomb structure so that the loading amount per unit volume after drying was 148 g/L. To load the catalyst, the honeycomb structure was dipped into the catalyst slurry for impregnation, followed by air-blowing to blow off the extra catalyst slurry. This was dried at the temperature of 120° C., followed by a heat treatment at 500° C. for 3 hours, whereby a honeycomb structure loaded with the catalyst was obtained. The loading amount of the catalyst at the honeycomb structure of Example 1 was 148 g/L. Table 2 shows the loading amount (g/L) of the catalyst at the honeycomb structure.

TABLE 2

| | Loading amount of catalyst (g/L) | Filling rate of catalyst (%) | Increasing rate of pressure loss before and after loading with catalyst (%) | Isostatic strength (MPa) |
|---|---|---|---|---|
| Example 1 | 148 | 83 | 27 | 2.3 |
| Example 2 | 152 | 86 | 48 | 2.5 |
| Example 3 | 143 | 84 | 10 | 0.9 |
| Example 4 | 158 | 82 | 15 | 2.9 |
| Example 5 | 137 | 86 | 9 | 2.1 |
| Example 6 | 155 | 80 | 20 | 0.7 |
| Example 7 | 164 | 84 | 12 | 2.9 |
| Example 8 | 153 | 85 | 9 | 3.3 |
| Example 9 | 149 | 86 | 6 | 2.8 |
| Example 10 | 150 | 80 | 32 | 2.1 |
| Example. 11 | 141 | 82 | 24 | 1.7 |
| Example 12 | 160 | 89 | 21 | 2.3 |
| Comparative Example. 1 | 165 | 81 | 56 | 3.5 |

TABLE 2-continued

|  | Loading amount of catalyst (g/L) | Filling rate of catalyst (%) | Increasing rate of pressure loss before and after loading with catalyst (%) | Isostatic strength (MPa) |
|---|---|---|---|---|
| Comparative Example. 2 | 142 | 83 | 13 | 0.4 |
| Comparative Example. 3 | 138 | 76 | 11 | 2 |
| Comparative Example. 4 | 150 | 74 | 21 | 2.8 |
| Comparative Example. 5 | 151 | 70 | 36 | 1.2 |
| Comparative Example. 6 | 145 | 69 | 8 | 2.1 |
| Comparative Example. 7 | 154 | 79 | 13 | 0.7 |
| Comparative Example. 8 | 141 | 74 | 14 | 0.8 |
| Comparative Example. 9 | 150 | 68 | 16 | 1.7 |
| Comparative Example. 10 | 163 | 73 | 18 | 1.0 |
| Comparative Example. 11 | 154 | 72 | 8 | 1.7 |
| Comparative Example. 12 | 136 | 72 | 10 | 1.8 |
| Comparative Example. 13 | 149 | 77 | 9 | 2.4 |

For the honeycomb structure of Example 1, the "filling rate of catalyst (%)", the "increasing rate of pressure loss before and after loading with catalyst (%)" and the "isostatic strength (MPa)" were measured by the following method. Table 2 shows the result.

(Filling Rate of Catalyst (%))

From the honeycomb structure body of the honeycomb structure of Example 1, a test piece for measurement of 20 mm, 20 mm, and 20 mm in width, height and depth, respectively, was cut out. The partition wall of this test piece was polished, and then SEM images of three fields of view were captured at random with a scanning electron microscope (SEM). The dimensions of one field of view of the captured field of view was the width (m) of one partition wall in direction X and 600 µm in direction Y. Then when the honeycomb structure was loaded with a catalyst, the ratio (percentage) of the volume ($V_1$) of the pores that were actually filled with the catalysts relative to the volume ($V_0$) of all of the pores formed in the partition wall was obtained. Specifically the images were analyzed to extract a part of the pores (including pores impregnated with the catalysts and pores not impregnated with the catalysts) by binarization and then the volume ($V_0$) of all of the pores formed in the partition wall was calculated. Next the honeycomb structure was loaded with the catalyst, and the images were analyzed to extract a part of the pores impregnated with the catalysts by binarization and then the volume $V_1$ was obtained. Then based on these values, the filling rate of catalyst (%) was calculated. Table 2 shows the value of the filling rate of catalyst (%) that was the arithmetic mean value of the filling rates of the SEM images in three fields of view. When the filling rate of catalyst was 80% or more, the honeycomb structure was accepted.

(Increasing Rate of Pressure Loss Before and after Loading with Catalyst (%))

Air at room temperatures was allowed to flow through the honeycomb structure before loading with a catalyst at the flow rate of 10 µm³/min., and the pressure at the side of the inflow end face and at the side of the outflow end face was measured. Then a difference in pressure between the side of the inflow end face and the side of the outflow end face was calculated to obtain the pressure loss (kPa) of the honeycomb structure before loading with a catalyst. For the honeycomb structure loaded with the catalyst as well, the pressure loss (kPa) was obtained in a similar manner to the above. The pressure loss of the honeycomb structure before loading with a catalyst is defined as "P1" and the pressure loss of the honeycomb structure after loading with a catalyst is defined as "P2", the "increasing rate of pressure loss before and after loading with a catalyst (%)" was obtained by the following Expression (1). When the increasing rate of pressure loss before and after loading with a catalyst was 50% or less, the honeycomb structure was accepted.

Increasing rate of a pressure loss before and after loading with a catalyst (%)=(P2−P1)/P1×100%. Expression (1):

(Isostatic Strength (MPa))

An isostatic strength was measured in accordance with the isostatic fracture strength testing specified at M505-87 of the Japanese Automotive Standards Organization (JASO) that is a specification issued by the Society of Automotive Engineers of Japan. The isostatic fracture strength testing is conducted by placing a honeycomb structure in a rubber-made tubular container, which is sealed with an aluminum plate, and applying an isostatic pressure thereto in water. An isostatic strength measured by this isostatic fracture strength testing is indicated as a pressure (MPa) applied when the honeycomb structure breaks down. When this isostatic strength was 0.7 MPa or more, the honeycomb structure was "accepted", and when the isostatic strength was less than 0.7 MPa, the honeycomb structure was "rejected".

Examples 2 to 12

As shown in Table 1, honeycomb structures were manufactured by changing the thickness of a partition wall, the cell density, the porosity, the overall pore volume, the average pore diameter, and the ratio of pore volume having a certain range of pore diameters. The porosity, the overall pore volume, the average pore diameter, and the ratio of pore volume having a certain range of pore diameters was adjusted (i.e., adjustment of the cumulative pore volume) by adjusting the particle diameter and the amount of the pore former added to the forming raw material.

In Example 2, the amount of the pore former added was 1.7 parts by mass, and the pore former had the average particle diameter of 20 µm. The amount of the pore former added indicates the ratio relative to 100 parts by mass of cordierite forming raw material, and the same goes for the following examples.

In Example 3, the amount of the pore former added was 4.9 parts by mass, and the pore former had the average particle diameter of 35 µm.

In Example 4, the amount of the pore former added was 3.0 parts by mass, and the pore former had the average particle diameter of 40 µm.

In Example 5, the amount of the pore former added was 3.8 parts by mass, and the pore former had the average particle diameter of 30 µm.

In Example 6, the amount of the pore former added was 3.3 parts by mass, and the pore former had the average particle diameter of 20 µm.

In Example 7, the amount of the pore former added was 2.8 parts by mass, and the pore former had the average particle diameter of 30 µm.

In Example 8, the amount of the pore former added was 2.2 parts by mass, and the pore former had the average particle diameter of 20 rpm.

In Example 9, the amount of the pore former added was 3.6 parts by mass, and the pore former had the average particle diameter of 30 μm.

In Example 10, the amount of the pore former added was 2.5 parts by mass, and the pore former had the average particle diameter of 30 μm.

In Example 11, the amount of the pore former added was 3.1 parts by mass, and the pore former had the average particle diameter of 20 μm.

In Example 12, the amount of the pore former added was 1.8 parts by mass, and the pore former had the average particle diameter of 25 μm.

Comparative Examples 1 to 13

As shown in Table 1, honeycomb structures was manufactured by changing the thickness of a partition wall, the cell density, the porosity, the overall pore volume, the average pore diameter, and the ratio of pore volume having a certain range of pore diameters. The porosity, the overall pore volume, the average pore diameter, and the ratio of pore volume having a certain range of pore diameters was adjusted (i.e., adjustment of the cumulative pore volume) by adjusting the particle diameter and the amount of the pore former added to the forming raw material.

In Comparative Example 1, the amount of the pore former added was 1.5 parts by mass, and the pore former had the average particle diameter of 25 μm.

In Comparative Example 2, the amount of the pore former added was 5.1 parts by mass, and the pore former had the average particle diameter of 35 μm.

In Comparative Example 3, the amount of the pore former added was 3.1 parts by mass, and the pore former had the average particle diameter of 15 μm.

In Comparative Example 4, the amount of the pore former added was 2.2 parts by mass, and the pore former had the average particle diameter of 40 μm.

In Comparative Example 5, the amount of the pore former added was 3.3 parts by mass, and the pore former had the average particle diameter of 40 μm.

In Comparative Example 6, the amount of the pore former added was 4.1 parts by mass, and the pore former had the average particle diameter of 35 μm.

In Comparative Example 7, the amount of the pore former added was 4.9 parts by mass, and the pore former had the average particle diameter of 30 μm.

In Comparative Example 8, the amount of the pore former added was 4.9 parts by mass, and the pore former had the average particle diameter of 30 μm.

In Comparative Example 9, the amount of the pore former added was 4.6 parts by mass, and the pore former had the average particle diameter of 30 μm.

In Comparative Example 10, the amount of the pore former added was 4.3 parts by mass, and the pore former had the average particle diameter of 35 μm.

In Comparative Example 11, the amount of the pore former added was 4.9 parts by mass, and the pore former had the average particle diameter of 30 μm.

In Comparative Example 12, the amount of the pore former added was 4.1 parts by mass, and the pore former had the average particle diameter of 35 μm.

In Comparative Example 13, the amount of the pore former added was 4.0 parts by mass, and the pore former had the average particle diameter of 40 μm.

For the honeycomb structure of Examples 2 to 12 and Comparative Examples 1 to 13, the "filling rate of catalyst (%)", the "increasing rate of pressure loss before and after loading with catalyst (%)" and the "isostatic strength (MPa)" were measured. Table 2 shows the result.

(Results)

The honeycomb structures of Examples 1 to 12 showed favorable results for the "filling rate of catalyst (%)", the "increasing rate of pressure loss before and after loading with catalyst (%)" and the "isostatic strength (MPa)". On the contrary, the honeycomb structures of Comparative Examples 3 to 13 had the filling rate of catalyst that was less than 80%, and the pores of the partition wall were less fillable with catalysts. The honeycomb structures of Comparative Examples 1 and 2 were rejected about the result of other evaluations.

The honeycomb structure of the present invention can be used for a catalyst carrier to be loaded with a catalyst to purify exhaust gas.

DESCRIPTION OF REFERENCE NUMERALS 1, 21: partition wall, 2, 22: cell, 3, 23: circumferential wall, 4, 24: honeycomb structure body, 11, 31: first end face, 12, 32: second end face, 22a: inflow cell, 22b: outflow cell, 25: plugging portion, 100, 200: honeycomb structure

What is claimed is:

1. A honeycomb structure, comprising: a pillar-shaped honeycomb structure body having a first end face and a second end face and including a porous partition wall disposed so as to surround a plurality of cells, the plurality of cells extending from the first end face to the second end face and serving as a through channel of fluid, wherein
the partition wall has a porosity of 45 to 65%,
the partition wall has an average pore diameter of 15 to 25 μm,
the partition wall has a cumulative pore volume, which is measured by mercury intrusion porosimetry, such that a pore volume ratio of pores having pore diameters of 10 μm or less relative to the overall pore volume of the partition wall is 10% or less, and a pore volume ratio of pores having pore diameters of 40 μm or more is 10% or less, and
wherein the honeycomb structure has a filling rate of catalyst of 80% or more, an increasing rate in pressure loss before and after loading with catalyst of 50% or less, and an isostatic strength of 0.7 MPa or more.

2. The honeycomb structure according to claim 1, wherein the partition wall has a thickness of 0.089 to 0.203 mm.

3. The honeycomb structure according to claim 1, wherein the honeycomb structure body has a cell density of 31 to 140 cells/cm$^2$.

4. The honeycomb structure according to claim 1, wherein the partition wall comprises at least one type of materials selected from the group consisting of silicon carbide, cordierite, silicon-silicon carbide composite material, cordierite-silicon carbide composite material, silicon nitride, mullite, alumina, and aluminum titanate.

5. The honeycomb structure according to claim 1, further comprising catalysts to purify exhaust gas that are loaded inside of pores of the partition wall.

* * * * *